United States Patent
Ge (10) Patent No.: US 10,247,085 B2
(45) Date of Patent: Apr. 2, 2019

(54) HYBRID THERMOSTAT AND METHOD FOR OPERATING SAME

(71) Applicant: Caterpillar Inc., Peoria, IL (US)

(72) Inventor: Xinyu Ge, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 64 days.

(21) Appl. No.: 15/376,764

(22) Filed: Dec. 13, 2016

(65) Prior Publication Data

US 2018/0163609 A1   Jun. 14, 2018

(51) Int. Cl.

| F01P 7/16 | (2006.01) |
|---|---|
| G05D 23/19 | (2006.01) |
| F01P 7/14 | (2006.01) |
| E02F 9/20 | (2006.01) |
| E02F 9/22 | (2006.01) |

(52) U.S. Cl.
CPC .......... *F01P 7/167* (2013.01); *G05D 23/1925* (2013.01); *E02F 9/2095* (2013.01); *E02F 9/2267* (2013.01); *F01P 2007/146* (2013.01)

(58) Field of Classification Search
CPC .... F01P 7/16; F01P 7/165; F01P 7/167; F01P 7/168; F01P 2007/146; G05D 23/1925; G05D 23/275; G05D 23/27537; G05D 23/27541; G05D 23/30
See application file for complete search history.

(56) References Cited

U.S. PATENT DOCUMENTS

| 4,616,599 A | 10/1986 | Taguchi et al. |
| 5,195,467 A * | 3/1993 | Kurz ...................... F01P 7/167 |
| | | 123/41.1 |
| 5,669,335 A | 9/1997 | Hollis |
| 5,813,598 A * | 9/1998 | Kim .......................... F01P 11/18 |
| | | 236/34.5 |
| 6,055,947 A | 5/2000 | Okuno |
| 6,668,764 B1 | 12/2003 | Henderson et al. |
| 6,742,716 B1 | 6/2004 | Duprez et al. |
| 6,820,817 B2 | 11/2004 | Leu |
| 6,857,576 B2 | 2/2005 | Peter |
| 7,347,168 B2 | 3/2008 | Reckels et al. |
| 7,987,822 B2 | 8/2011 | Fishman et al. |
| 9,062,592 B2 | 6/2015 | Lee et al. |
| 2012/0029725 A1 | 2/2012 | Lafleur et al. |
| 2015/0369113 A1 | 12/2015 | Arbel et al. |
| 2016/0061093 A1 | 3/2016 | Johansson et al. |

* cited by examiner

*Primary Examiner* — Jonathan Bradford
(74) *Attorney, Agent, or Firm* — Harrity & Harrity LLP (57) ABSTRACT

A hybrid thermostat valve for a machine includes an inlet port, a first outlet port and a second outlet port. A sealing member located between the inlet port and the first outlet port includes holes providing a first channel of fluid communication between the inlet port and the first outlet port. A valve element located between the inlet port and the first outlet port selectively allows fluid communication between the inlet port and the first outlet port through the first channel. A bypass valve element located between the inlet port and the second outlet port selectively allows fluid communication between the inlet port and the second outlet port. Further, an actuator selectively controls position of the sealing member to provide a second channel of fluid communication between the inlet port and the first outlet port based on a current work cycle segment being performed by the machine.

20 Claims, 8 Drawing Sheets

HYBRID THERMOSTAT AND METHOD FOR OPERATING SAME

TECHNICAL FIELD

The present disclosure relates to a system and a method for controlling a cooling system of an engine. More specifically, the present disclosure relates to controlling a hybrid thermostat valve within the cooling system of the engine.

BACKGROUND

Generally, an engine includes a cooling system in order to maintain a temperature of the engine within allowable range when the engine may operate under different conditions. The cooling system is designed to limit overheating of the engine in various operating conditions. The cooling system also provides to improve fuel efficiency by controlling a thermostat valve in order to control coolant flow rates in order to provide necessary cooling capacity according to a machine, the engine and/or environmental conditions. The cooling system also provides to reduce emissions as a temperature of an after-treatment system and an intake manifold associated with the engine may dramatically impact engine emissions, such as Nitrous Oxides ($NO_x$), Carbon Monoxide (CO), and/or Particulate Matter (PM).

However, a traditional thermostat valve may be difficult to control in order to achieve the required cooling capacity. Typically, the thermostat valve is actuated by a change of coolant temperature. When the coolant temperature is reduced below a threshold, the thermostat valve may be closed. In such a situation, the coolant may be circulated through the engine without passing through a radiator. When the coolant temperature increases above the threshold, the thermostat valve may open in order to allow the coolant to pass through the radiator. However, there may be a time lag to change the temperature of the coolant via heat transfer. This may result in reduced performance of the cooling system in machines performing repetitive work cycles.

For example, a work cycle for an excavator may include a dig segment, a lift segment, a swing to truck segment, a dump segment, and a swing to worksite segment. When the excavator performs the dig segment, a required engine power may increase immediately, and a dissipated heat from the engine to the coolant may also increase. However, some time may be required for the coolant temperature to increase to the threshold. When the thermostat valve opens due to the increased coolant temperature, the excavator might be performing another segment of the work cycle, such as the swing to truck segment, the dump segment, and so on. As a result, the required engine power may decrease, but the thermostat valve may remain open to provide maximum cooling capacity until the coolant temperature may drop below the threshold.

When the thermostat valve responds to the reduced temperature by closing itself, the excavator might start performing the dig segment or the lift segment. As a result, the coolant temperature may again increase after the thermostat valve may be closed. In order to address the above concern, multiple engine operating parameters may be considered to electronically control the thermostat valve. However, when one or more electronic components may fail, the thermostat valve may not perform satisfactorily in turn resulting in a reduced performance or complete failure of the cooling system. Hence, there is a need for an improved system and method for controlling the cooling system of the engine.

U.S. Pat. No. 7,347,168 (hereinafter referred as the '168 patent) describes an improved vehicle cooling system. The cooling system has the capability of controlling various thermal components to effectively control heating and cooling of an engine of the vehicle based on instantaneous vehicle and ambient conditions and also based upon predictive conditions. These predictive conditions may include information about the upcoming terrain of the route along which the vehicle may travel. However, the system disclosed in the '168 patent may totally lose control function when one or more electronic components may fail. A more robust system is needed to perform control function when one or more electronic components does/do not operate correctly.

SUMMARY

In an aspect of the present disclosure, a hybrid thermostat valve for a machine carrying out a repetitive work cycle is provided. The work cycle includes multiple work cycle segments. The hybrid thermostat valve includes an inlet port, a first outlet port, and a second outlet port. The hybrid thermostat valve includes a sealing member located between the inlet port and the first outlet port. The sealing member has at least one hole providing a first channel of fluid communication between the inlet port and the first outlet port. The hybrid thermostat valve includes a valve element located between the inlet port and the first outlet port. The valve element selectively allows fluid communication between the inlet port and the first outlet port through the first channel. The hybrid thermostat valve includes a bypass valve element located between the inlet port and the second outlet port. The bypass valve element selectively allows fluid communication between the inlet port and the second outlet port. The hybrid thermostat valve further includes an actuator which selectively controls position of the sealing member to provide a second channel of fluid communication between the inlet port and the first outlet port based on a current work cycle segment being performed by the machine.

In another aspect of the present disclosure, a method for controlling a hybrid thermostat valve of a machine is provided. The machine carries out a repetitive work cycle having multiple work cycle segments. The hybrid thermostat valve includes an inlet port, a first outlet port, and a second outlet port. The method includes checking a status of machine electronics. The method includes receiving operational data indicative of an operational state of the machine in response to the status of the machine electronics being functional. The method includes comparing the operational data with a pre-defined work cycle pattern. The method includes calculating a probability of matching of the operational data with the pre-defined work cycle pattern. The method includes identifying a current work cycle segment being performed by the machine based on the comparison, in response to the probability of matching of the operational data with the pre-defined work cycle pattern being higher than a threshold value. The method further includes controlling the hybrid thermostat valve to selectively allow a coolant flow from the inlet port towards the first outlet port and the second outlet port based on the identified current work cycle segment.

In yet another aspect of the present disclosure, a machine including an engine having an associated engine cooling system is provided. The machine includes a hybrid thermostat valve for controlling a flow of coolant in the engine cooling system. The hybrid thermostat valve includes an inlet port, a first outlet port, and a second outlet port. The hybrid thermostat valve includes a sealing member located between the inlet port and the first outlet port. The sealing member has at least one hole providing a first channel of fluid communication between the inlet port and the first outlet port. The hybrid thermostat valve includes a valve element located between the inlet port and the first outlet port. The valve element selectively allows fluid communication between the inlet port and the first outlet port through the first channel. The hybrid thermostat valve includes a bypass valve element located between the inlet port and the second outlet port. The bypass valve element selectively allows fluid communication between the inlet port and the second outlet port. The hybrid thermostat valve further includes an actuator which selectively controls position of the sealing member to provide a second channel of fluid communication between the inlet port and the first outlet port based on a current work cycle segment being performed by the machine.

DETAILED DESCRIPTION

Figure 1:
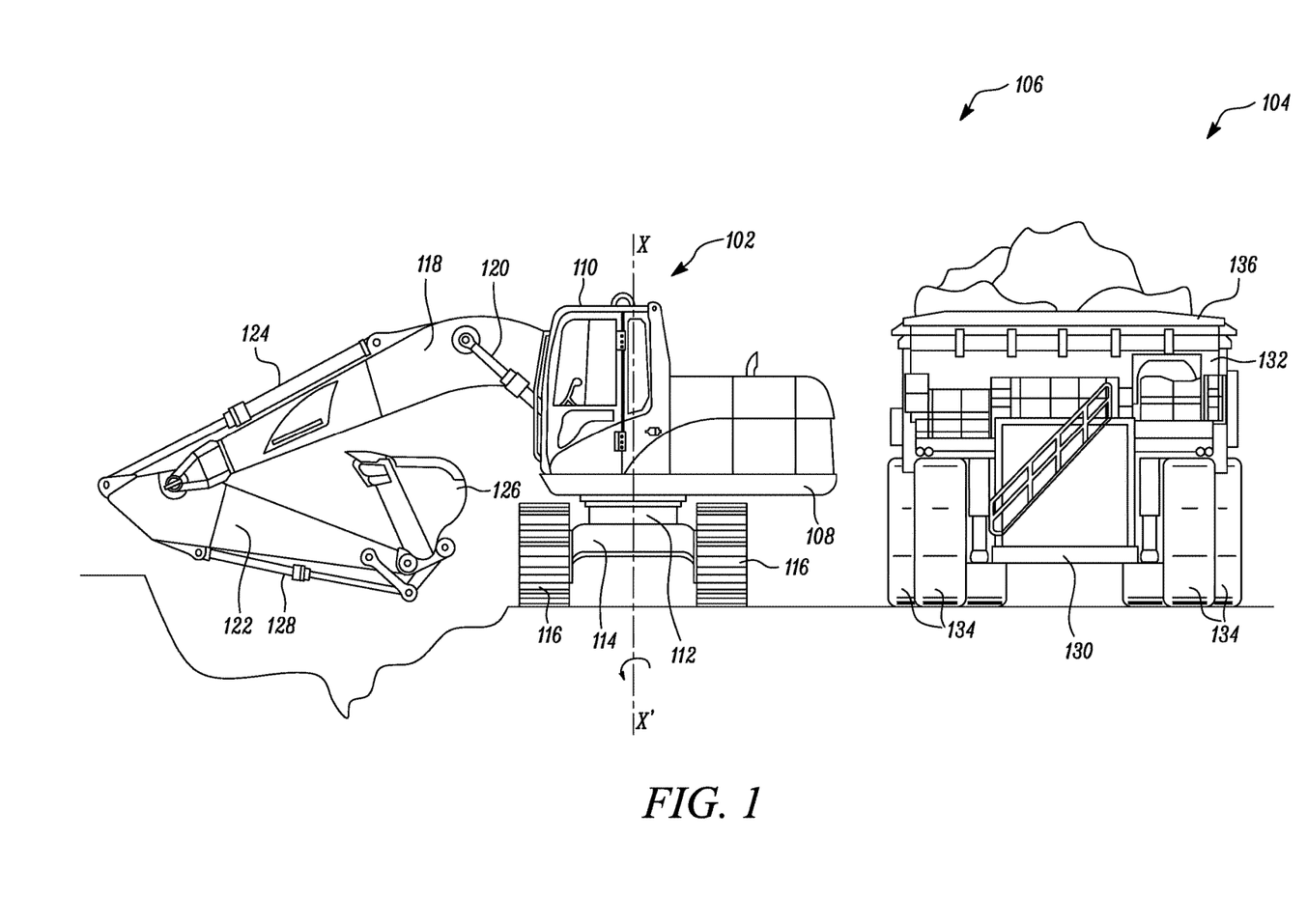
FIG. 1 illustrates exemplary machines, such as an excavator and a mining truck, working on a worksite, according to an embodiment of the present disclosure.

Wherever possible, the same reference numbers will be used throughout the drawings to refer to same or like parts. FIG. 1 illustrates machines, such as an excavator 102 and a mining truck 104, working on a worksite 106. It should be noted that the machines described herein are merely exemplary and may vary based on application requirements. For example, in other embodiments, the worksite 106 may include one or more machines including, but not limited to, a wheel loader, a track loader, a track type tractor, a backhoe loader, and an articulated truck. The machine may be associated with an industry including, but not limited to, mining, construction, transportation, agriculture, forestry, or waste management.

The excavator 102 includes a chassis 108 and a cab 110 supported by a turret 112. The turret 112 rotates about an axis X-X'. The turret 112 is supported by an undercarriage 114. The undercarriage 114 may include or may be coupled to numerous components for driving ground engaging elements, such as tracks 116. The chassis 108 is coupled to a boom 118 and a boom cylinder 120. The boom 118 is coupled to a stick 122 and a stick cylinder 124. The stick 122 is coupled to a bucket 126 and a bucket cylinder 128. The bucket 126, in association with the boom 118, the boom cylinder 120, the stick 122, the stick cylinder 124, and the bucket cylinder 128, is adapted to dig material from one location and transfer the material to another location.

The mining truck 104 includes a chassis 130 and a cab 132 supported thereon. The chassis 130 may include or may be coupled to numerous components for driving ground engaging elements, such as wheels 134. The chassis 130 also includes a dump bed 136 supported thereon. The dump bed 136 is adapted to receive material for being transported from one location to another. Each of the machines, viz., the excavator 102 and the mining truck 104 may include engines (not shown) with cooling requirements provided by a cooling system associated with the respective machines.

In a typical cyclic or repetitive work cycle, the excavator 102 may carry out a dig operation or a dig segment in an exemplary position shown in FIG. 1, such that the bucket 126 is at least partially filled with the material. After the bucket 126 is raised during a lift segment, the excavator 102, or more specifically, the turret 112 of the excavator 102, may rotate about the axis X-X' during a swing segment to place the bucket 126 in a position over the dump bed 136 of the mining truck 104. Then, in a dump segment of the work cycle, the material within the bucket 126 may be dumped onto the dump bed 136. Finally, the turret 112 may rotate back to the position shown in FIG. 1 in another swing segment to start a new work cycle, beginning with another dig segment.

In summary, the work cycle illustrated in FIG. 1 may include the dig segment, the lift segment, the swing segment, the dump segment and another swing segment. Such a work cycle may also be divided into less than or more than five segments based on application requirements. Regardless, the dig segment and the lift segment consume more energy and power from the engine as compared to the swing segments or the dump segment. Thus, the cooling requirements of the engine decrease for the swing segments and the dump segments, and increase for the dig segments and the lift segments.

Disclosed herein is a system and method for identifying when the machine, like the excavator 102 or the mining truck 104, is carrying out the repetitive work cycle, and for anticipating the cooling requirements of the respective engine for future segments of the identified work cycle. In short, the disclosed method and system recognizes a repetitive work cycle pattern and controls a hybrid thermostat valve associated with the cooling system of the engine in accordance with the increased or decreased cooling requirements of the engine for upcoming segments of the work cycle.

Figure 2:
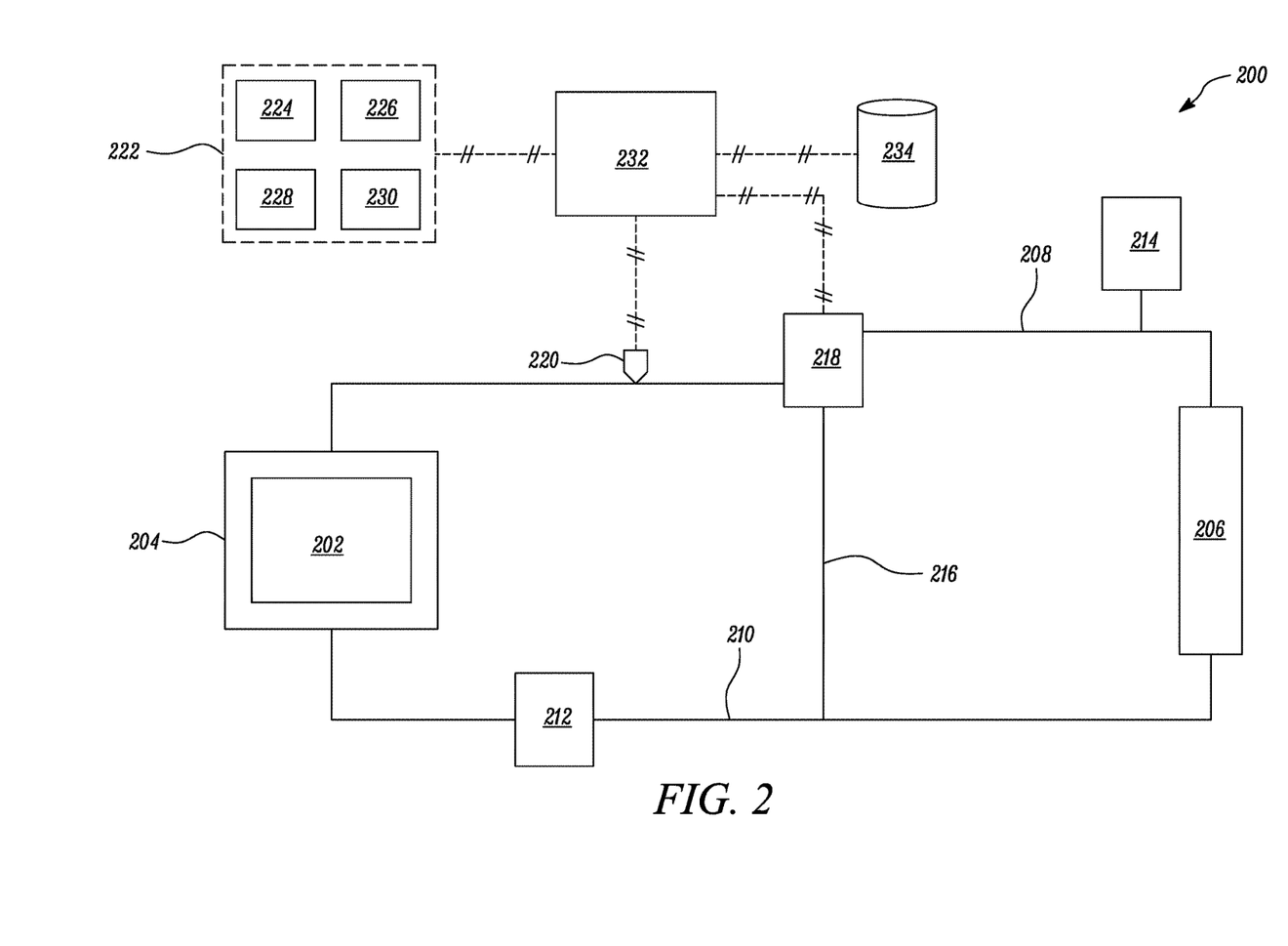
FIG. 2 is a schematic illustration of an exemplary engine cooling system associated with the excavator, according to an embodiment of the present disclosure.

Referring to FIG. 2, a schematic illustration of an exemplary engine cooling system 200 associated with an engine 202 of the excavator 102 is shown. The engine cooling system 200 includes a cooling jacket 204 provided around the engine 202. The cooling jacket 204 may include one or more fluid paths (not shown) provided in surrounding contact with and/or within the engine 202. The cooling jacket 204 receives a coolant therein for circulation thereof around and/or within the engine 202. Accordingly, the cooling jacket 204 enables transfer of heat from the engine 202 to the coolant.

The engine cooling system 200 includes a heat exchanger 206, such as a radiator. The heat exchanger 206 is fluidly coupled to the cooling jacket 204 via a return conduit 208.

Accordingly, the heated coolant within the cooling jacket 204 is transferred to the heat exchanger 206. The heat exchanger 206 enables transfer of heat from the coolant to atmosphere or another fluid therein. Accordingly, the heat exchanger 206 reduces a temperature of the heated coolant received therein from the cooling jacket 204. The heat exchanger 206 is further fluidly coupled to the cooling jacket 204 via a supply conduit 210. Accordingly, the cooled coolant is transferred back from the heat exchanger 206 to the cooling jacket 204 via the supply conduit 210.

The engine cooling system 200 includes a pump 212 fluidly coupled to the heat exchanger 206 and the cooling jacket 204. The pump 212 provides forced circulation of the coolant within the engine cooling system 200. The engine cooling system 200 also includes a reservoir 214 fluidly coupled to the cooling jacket 204 and the heat exchanger 206. The reservoir 214 stores and provides a supply of the coolant to the cooling jacket 204, the heat exchanger 206, and the pump 212. The engine cooling system 200 also includes a bypass conduit 216 fluidly coupled to the supply conduit 210 and the return conduit 208. The bypass conduit 216 allows the coolant from the cooling jacket 204 to bypass the heat exchanger 206 based on operational requirements.

The engine cooling system 200 further includes a hybrid thermostat valve 218 fluidly coupled to the return conduit 208 and the bypass conduit 216. The hybrid thermostat valve 218 provides means to selectively bypass at least a portion of the coolant from the cooling jacket 204 back to the supply conduit 210 for being circulated again through the cooling jacket 204 without passing through the heat exchanger 206 based on operation and application requirements. Structural details of the hybrid thermostat valve 218 will be explained in more detail with reference to FIGS. 3 to 6.

The engine cooling system 200 also includes a temperature sensor 220. In the illustrated embodiment, the temperature sensor 220 is provided in association with the cooling jacket 204 and the hybrid thermostat valve 218. In other embodiments, the temperature sensor 220 may be provided at any other location within the engine cooling system 200. The temperature sensor 220 may be configured to generate a signal indicative of the temperature of the coolant within the cooling jacket 204. The temperature sensor 220 may be any type of a temperature sensor known in the art, such as a thermistor type temperature sensor, resistance temperature detector type temperature sensor, a thermocouple type temperature sensor, a semiconductor type temperature sensor, and/or the like.

The engine cooling system 200 also includes an operational state sensor module 222. The operational state sensor module 222 may generate operational data indicative of an operational state of the machine. The operational state sensor module 222 may include a machine parameter sensor 224, an engine parameter sensor 226, a load sensor 228, a grade sensor 230, and/or the like. The machine parameter sensor 224 may include any one or a combination of sensors associated with the boom 118, the boom cylinder 120, the stick 122, the stick cylinder 124, the bucket 126, the bucket cylinder 128, the turret 112, the tracks 116, etc.

The engine parameter sensor 226 may be any one or a combination of sensors associated with the engine 202 of the excavator 102, such as an engine speed sensor, a cylinder pressure sensor, a crankshaft position sensor, a camshaft position sensor, an intake air temperature sensor, an exhaust gas temperature sensor, and/or the like. The load sensor 228 may include any one or a combination of sensors configured to generate an operational data indicative of the load on the machine, such as an engine load sensor, a bucket load sensor, and/or the like. The grade sensor 230 may include any one or a combination of sensors configured to generate an operational data indicative of the grade of the worksite 106, such as an inclination sensor, an altitude sensor, a Global Positioning System (GPS) sensor, and/or the like.

Further, the engine cooling system 200 includes a controller 232. The controller 232 may be a single controller or multiple controllers working together to perform a variety of tasks. The controller 232 may embody a single or multiple microprocessors, field programmable gate arrays (FPGAs), digital signal processors (DSPs), etc., that include a means for controlling operations of the machine in response to operator requests, built-in constraints, sensed operational parameters, and/or communicated instructions from an off-board controller (not shown). The controller 232 may also be an Engine Control Unit (ECU) of the machine 100. The controller 232 further includes an associated memory 234 for storing various operational parameters and specifications of the machine.

The controller 232 is communicably coupled to the temperature sensor 220. Accordingly, the controller 232 is configured to receive the signal indicative of the temperature of the coolant from the temperature sensor 220. The controller 232 is also communicably coupled to the operational state sensor module 222. Accordingly, the controller 232 is configured to receive the operational data indicative of the operational state of the machine. The controller 232 is further communicably coupled to the hybrid thermostat valve 218. The functionality of the controller 232 will be explained in more detail later.

Referring to FIGS. 3 to 6, the hybrid thermostat valve 218 includes a body 302. The hybrid thermostat valve 218 includes an inlet port 304 provided on the body 302. The inlet port 304 is fluidly coupled to the cooling jacket 204. Accordingly, the hybrid thermostat valve 218 receives the coolant therein from the cooling jacket 204 through the inlet port 304. The hybrid thermostat valve 218 includes a first outlet port 306 provided on the body 302. The first outlet port 306 is fluidly coupled to the heat exchanger 206 through the return conduit 208. The hybrid thermostat valve 218 also includes a second outlet port 308 provided on the body 302. The second outlet port 308 is fluidly coupled to the cooling jacket 204 through the bypass conduit 216.

The hybrid thermostat valve 218 includes a first seat 310 provided within the body 302. The hybrid thermostat valve 218 also includes a sealing member 312 and a valve element 314 provided in association with the first seat 310. The sealing member 312 includes one or more holes 316 provided therein. The hybrid thermostat valve 218 includes a second seat 318 provided within the body 302. The hybrid thermostat valve 218 includes a bypass valve element 320 provided in association with the second seat 318. The hybrid thermostat valve 218 also includes a spring 322 provided between the valve element 314 and the bypass valve element 320.

The hybrid thermostat valve 218 further includes a charge cylinder 324 provided axially with respect to an axis Y-Y' of the hybrid thermostat valve 218. The charge cylinder 324 is coupled between the sealing member 312, the valve element 314 and the bypass valve element 320. The valve element 314 is affixed to an outer surface of the charge cylinder 324. The charge cylinder 324 may include any temperature based phase change medium provided therein, such as wax. Based on a change of temperature of the charge cylinder 324 and the medium therein, the medium may expand or contract within the charge cylinder 324 resulting in an expansion or a contraction of the charge cylinder 324 respectively along the axis Y-Y'. The valve element 314 may move along the axis Y-Y' when the medium in the charge cylinder 324 expands or contracts.

The hybrid thermostat valve 218 further includes an actuator 326. The actuator 326 may be any actuator 326 known in the art, such as a torque motor, a step motor, and so on. The hybrid thermostat valve 218 includes a connecting element 328 coupled between the actuator 326 and the sealing member 312. The connecting element 328 transfers rotational motion from the actuator 326 to a linear movement of the sealing member 312. More specifically, based on an operation of the actuator 326, the connecting element 328 transfers rotational motion from the actuator 326 to a linear movement of the sealing member 312 along the axis Y-Y'. The connecting element 328 may be any motion transfer member known in the art, such as a worm gear set, a connecting rod etc.

The actuator 326 is electronically actuated and is communicably coupled to the controller 232. The actuator 326 only works when electronic systems of the machine adapted to effect operation of the actuator 326 are in operation and able to perform an intended task efficiently. An operational mode of the hybrid thermostat valve 218 when the actuator 326 is working may be referred to as an actuator ON mode and an operational mode of the hybrid thermostat valve 218 when the actuator 326 is not working may be referred to as an actuator OFF mode.

Additionally, the hybrid thermostat valve 218 also includes a position sensor 330 provided in association with the sealing member 312. The position sensor 330 generates a signal indicative of a position of the sealing member 312 with respect to the first seat 310. The position sensor 330 may be any position sensor known in the art, such as a capacitive type position sensor, an ultrasonic type position sensor, a Hall Effect type position sensor, a laser type position sensor, an optical type position sensor, and so on. The position sensor 330 may be communicably coupled to the controller 232 such that the controller 232 may keep track of the position of the sealing member 312 relative to the first seat 310.

Figure 3:
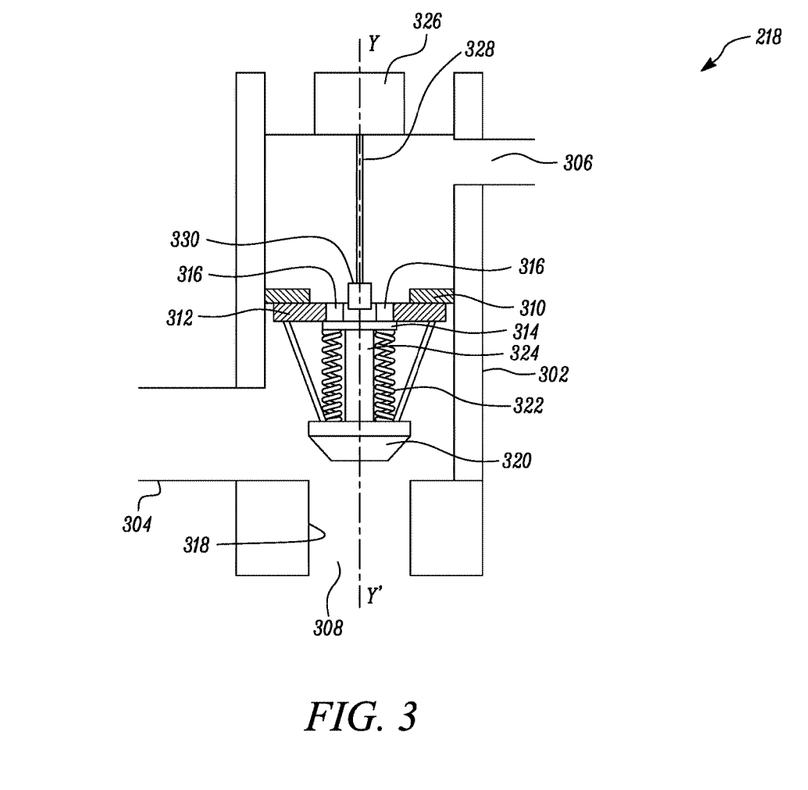
FIG. 3 is a schematic illustration of a hybrid thermostat valve of the engine cooling system of FIG. 2, according to an embodiment of the present disclosure.

FIGS. 3 to 6 illustrate various configurations of the hybrid thermostat valve 218 as per application and operational requirements. Referring to FIG. 3, during an actuator OFF mode, the hybrid thermostat valve 218 operates in the form of a mechanical thermostat valve. The sealing member 312 is forced to contact the first seat 310 through a biasing device in the actuator 326. More specifically, during a cool coolant condition, such as during an engine start condition or a low engine power condition, the charge cylinder 324 is compressed such that the valve element 314 is in contact with the sealing member 312. Also, the sealing member 312 is in contact with the first seat 310.

Accordingly, the holes 316 within the sealing member 312 are blocked by the valve element 314 and there is no fluid communication between the inlet port 304 and the first outlet port 306. Further, the bypass valve element 320 is disposed away from the second seat 318. Accordingly, the inlet port 304 is in fluid communication with the second outlet port 308. As such, in the actuator OFF mode and the cool coolant condition, the coolant flows within the engine cooling system 200 through the cooling jacket 204 and the bypass conduit 216 while bypassing the heat exchanger 206.

Figure 4:
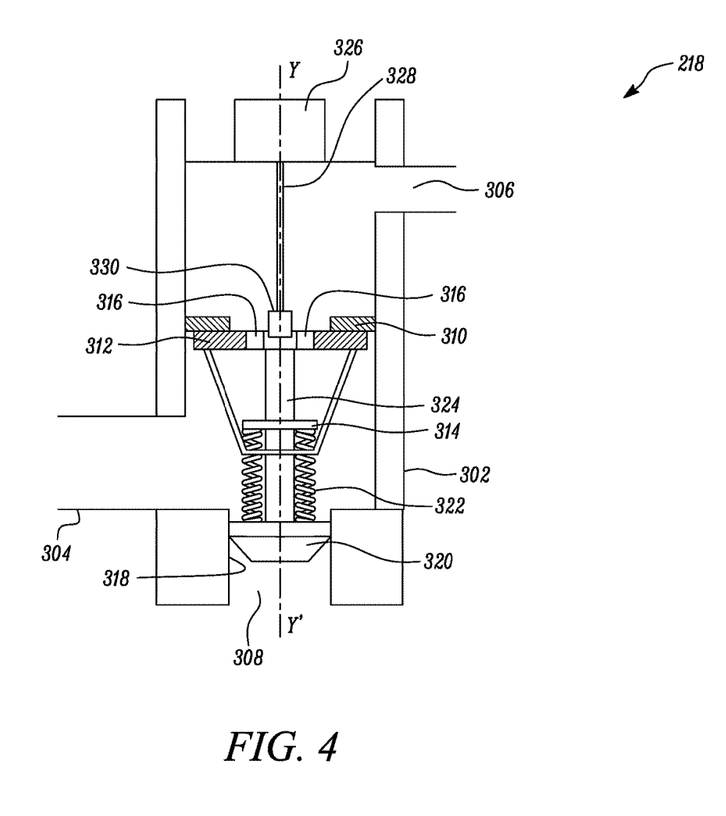
FIG. 4 is another schematic illustration of the hybrid thermostat valve of FIG. 3, according to an embodiment of the present disclosure.

Referring to FIG. 4, during the actuator OFF mode and a hot coolant condition, such as during an extended engine operation or a high engine power condition, the charge cylinder 324 is expanded such that the valve element 314 is disposed away with respect to the sealing member 312. Also, the sealing member 312 is in contact with the first seat 310. Accordingly, the holes 316 within the sealing member 312 are in fluid communication with the inlet port 304 providing a first channel of fluid communication between the inlet port 304 and the first outlet port 306. Further, the bypass valve element 320 is in contact with the second seat 318. Accordingly, fluid communication between the inlet port 304 and the second outlet port 308 is blocked. As such, in the actuator OFF mode and the hot coolant condition, the coolant flows within the engine cooling system 200 through the cooling jacket 204, the return conduit 208, the heat exchanger 206, and the supply conduit 210 back to the cooling jacket 204.

Figure 5:
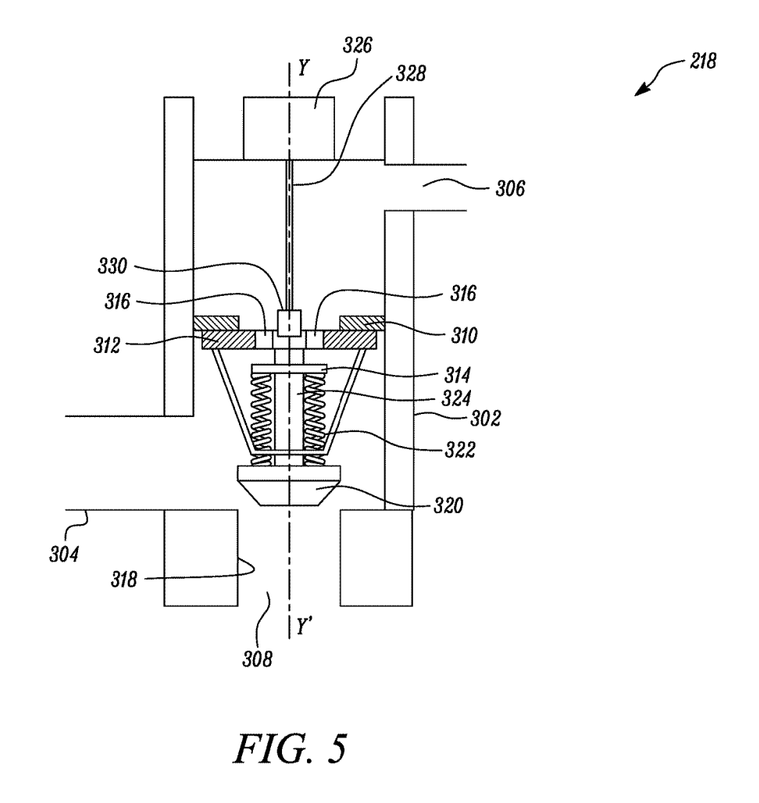
FIG. 5 is another schematic illustration of the hybrid thermostat valve of FIG. 3, according to an embodiment of the present disclosure.

Referring to FIG. 5, during the actuator OFF mode and a warm coolant condition, such as during a regular engine operation or a medium engine power condition, the charge cylinder 324 is expanded such that the valve element 314 is disposed away with respect to the sealing member 312. Also, the sealing member 312 is in contact with the first seat 310. Accordingly, the holes 316 within the sealing member 312 are in fluid communication with respect to the inlet port 304 and there is fluid communication between the inlet port 304 and the first outlet port 306 through the first channel.

Further, the bypass valve element 320 is also disposed away from the second seat 318. Accordingly, the inlet port 304 is in fluid communication with the second outlet port 308. As such, in the actuator OFF mode and the warm coolant condition, a portion of the coolant flows within the engine cooling system 200 through the cooling jacket 204 and the bypass conduit 216 while bypassing the heat exchanger 206 as described with reference to FIG. 3 whereas a remaining portion of the coolant flows through the return conduit 208, the heat exchanger 206, and the supply conduit 210 back to the cooling jacket 204 as described with reference to FIG. 4.

Figure 6:
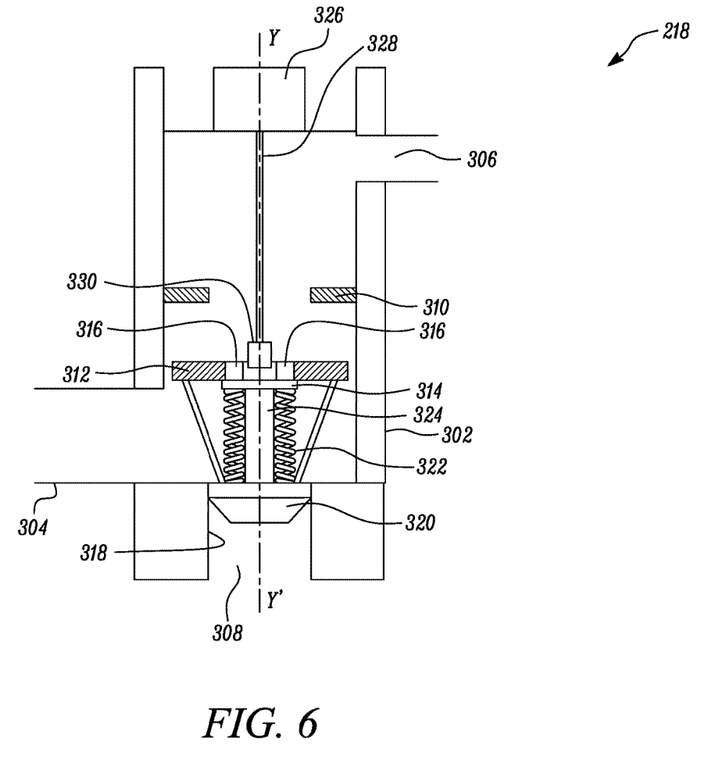
FIG. 6 is another schematic illustration of the hybrid thermostat valve of FIG. 3, according to an embodiment of the present disclosure.

Referring to FIG. 6, the hybrid thermostat valve 218 is shown in the actuator ON mode. The actuator 326 is controlled via the controller 232 in the actuator ON mode. The actuator 326 controls the position of the sealing member 312 through the connecting element 328 to displace the sealing member 312 away from the first seat 310 to provide a second channel of fluid communication between the inlet port 304 and the first outlet port 306. The valve element 314 is in contact with the sealing member 312 such that the holes 316 are covered by the valve element 314 and the first channel of fluid communication between the inlet port 304 and the first outlet port 306 is not available and the coolant flows through the second channel only. Further, the bypass valve element 320 is in contact with the second seat 318. Accordingly, fluid communication between the inlet port 304 and the second outlet port 308 is blocked. The position of the sealing member 312 is controlled by the actuator 326 based on various operational parameters.

Figure 7:
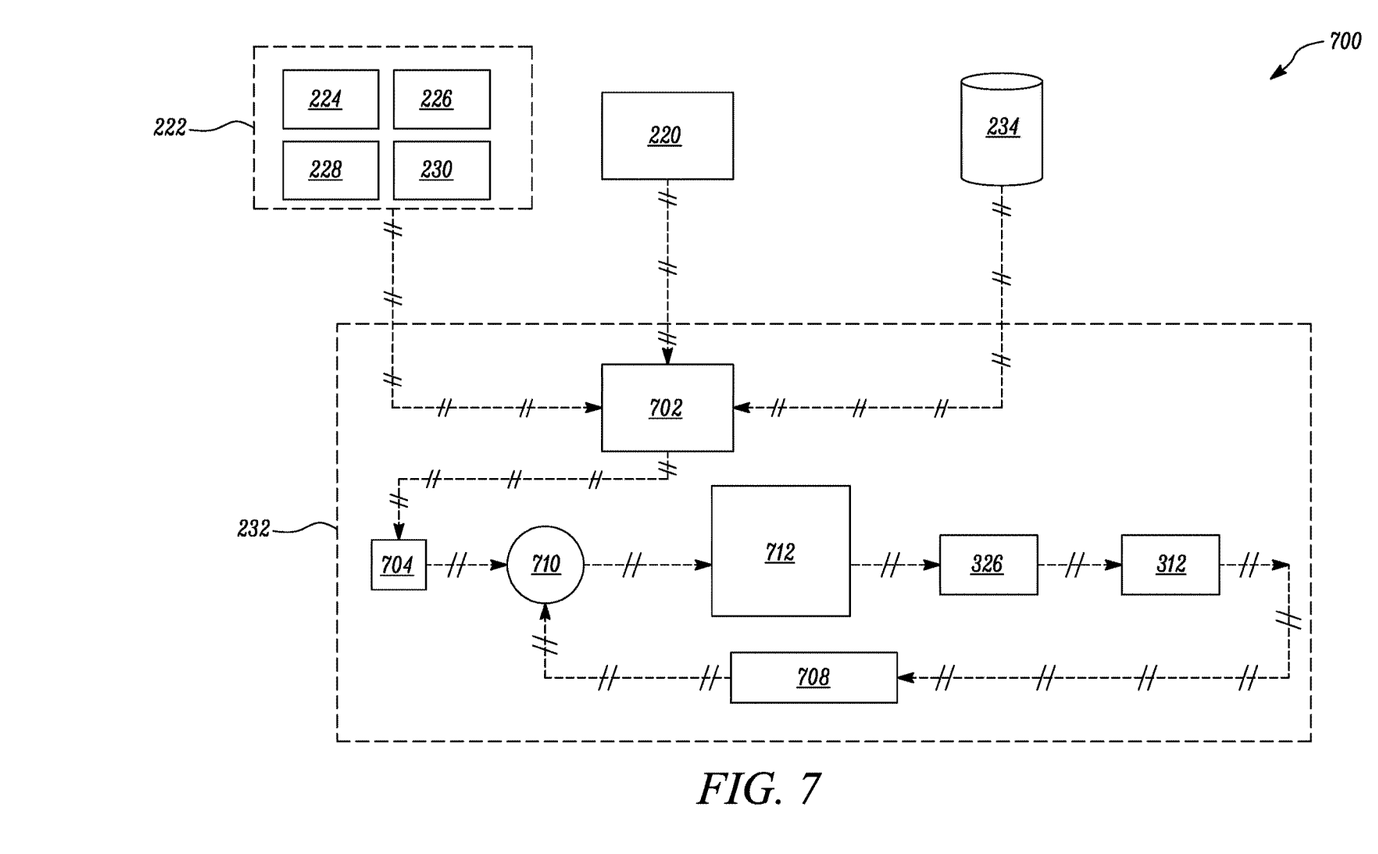
FIG. 7 is a schematic illustration of a control system to control the hybrid thermostat valve, according to an embodiment of the present disclosure.

FIG. 7 illustrates the various components of a control system 700 through which the controller 232 controls the position of the sealing member 312. The control system 700 includes the controller 232. The controller 232 is communicably coupled to the temperature sensor 220 and the operational state sensor module 222. The temperature sensor 220 generates signals indicative of the coolant temperature. The operational state sensor module 222 generates the operational data indicative of the operational state of the machine. The operational state sensor module 222 may include any one or a combination of the machine parameter sensor 224, the engine parameter sensor 226, the load sensor 228, and the grade sensor 230.

The controller 232 may also include the associated memory 234 having a plurality of work cycle patterns stored therein. The controller 232 includes a pattern recognition module 702 which periodically receives operational data from the operational state sensor module 222 and compares the operational data with the plurality of work cycle patterns stored in the memory 234. The pattern recognition module 702 compares the operational data against the work cycle patterns stored in the memory 234 to determine if the machine is carrying out a known repetitive work cycle.

One example of a repetitive work cycle that may be stored as a work cycle pattern is that of the excavator 102 repeatedly performing a work cycle that includes the following segments: dig, lift, swing to dump position, dump, swing back to dig position, etc. The dig segment of this work cycle requires more work by the excavator 102, consequently a greater cooling requirement. Conversely, other segments of the above work cycle do not require as much work and the cooling requirements are not as high, such as during the swing and dump segments. The pattern recognition module 702 identifies a work cycle that is being repeated by a machine, compares that work cycle against work cycle patterns stored in the memory 234 and, using a probability match or other suitable matching technique, and determines which stored work cycle pattern best fits the repetitive work cycle that the machine is currently carrying out. The pattern recognition module 702 may identify the appropriate stored work cycle pattern after a number of iterations.

Firstly, the controller 232 determines status of machine electronics. The machine electronics include electronic controls of the actuator 326 and the sensors associated with the operational state sensor module 222. The machine electronics may also include any other electronic components as per application requirements. If status of the machine electronics is functional, the hybrid thermostat valve 218 is controlled by the controller 232 through the control system 700. However, if the status of machine electronics is not functional, the thermostat vale system 218 is controlled like a mechanical thermostat valve as explained in FIGS. 3 to 5 in the actuator OFF mode based on the coolant temperature only.

The controller 232 may compare the operational data received from the operational state sensor module 222 with the stored work cycle patterns through the pattern recognition module 702. The pattern recognition module 702 may identify a current work cycle segment of the work cycle being performed by the machine based on the comparison. The pattern recognition module 702 may calculate a probability of matching of the operational data with the stored work cycle patterns (or, in other words, a probability of a match between the operational data and the stored work cycle patterns). In case the probability of matching is less than a threshold value, the pattern recognition module 702 may communicate to the controller 232 that the operational data does not correspond to any of the stored work cycle patterns. In some embodiments, the threshold value may be 50%. In some embodiments, the threshold value may vary based on various factors including, for example, the type of the machine, the make of the machine, the operational conditions, various other parameters, and/or the like. In such a case, the hybrid thermostat valve 218 is again controlled as a mechanical thermostat valve as explained in the FIGS. 3 to 5.

However, if the probability of matching exceeds the threshold value, the pattern recognition module 702 communicates to the controller 232 that the machine is performing one of the stored work cycle patterns. The controller 232 then determines a desired position 704 of the sealing member 312 according to the current work cycle segment and controls the actuator 326 to effect the movement of the sealing member 312 through the connecting element 328 so as to provide a required coolant flow through the second channel of fluid communication between the inlet port 304 and the first outlet port 306 as explained in FIG. 6.

The control system 700 further includes a closed loop feedback mechanism to effectively control the desired position 704 of the sealing member 312 of the hybrid thermostat valve 218. The closed loop feedback mechanism receives an actual position 708 of the sealing member 312 through the position sensor 330 and calculates an error 710 between the actual position 708 and the desired position 704 of the sealing member 312. Once the error 710 is calculated, an error control module 712 effects the movement of the actuator 326 to change the position of the sealing member 312 so as to minimize the error 710 in the position of the sealing member 312. The error control module 712 may be any type of a conventional control mechanism such as a PID controller (proportional-integral-derivative controller), PI controller, and/or the like which works on closed loop feedback of the variable to be controlled, which in this case, is the position of the sealing member 312. Thus, the control system 700 controls the position of the sealing member 312 based on the current work cycle segment being performed by the machine.

It should be contemplated that the controller 232 may also store in the associated memory 234 a desired position of the sealing member 312 for each of the segments of the work cycle. On identifying the current work cycle segment of the work cycle, the controller 232 may retrieve the desired position from the memory 234 and control the actuator 326 accordingly to control position of the sealing member 312 through the connecting element 328.

INDUSTRIAL APPLICABILITY

The present disclosure relates to the hybrid thermostat valve 218. The hybrid thermostat valve 218 may be used with the engine cooling system 200 associated with the engine 202. The hybrid thermostat valve 218 provides means to proactively control the coolant flow in the engine cooling system 200 according to the operational conditions of the machine. The present disclosure further provides a method for controlling the hybrid thermostat valve 218 explained with the help of a flow chart shown in FIG. 8.

Figure 8:
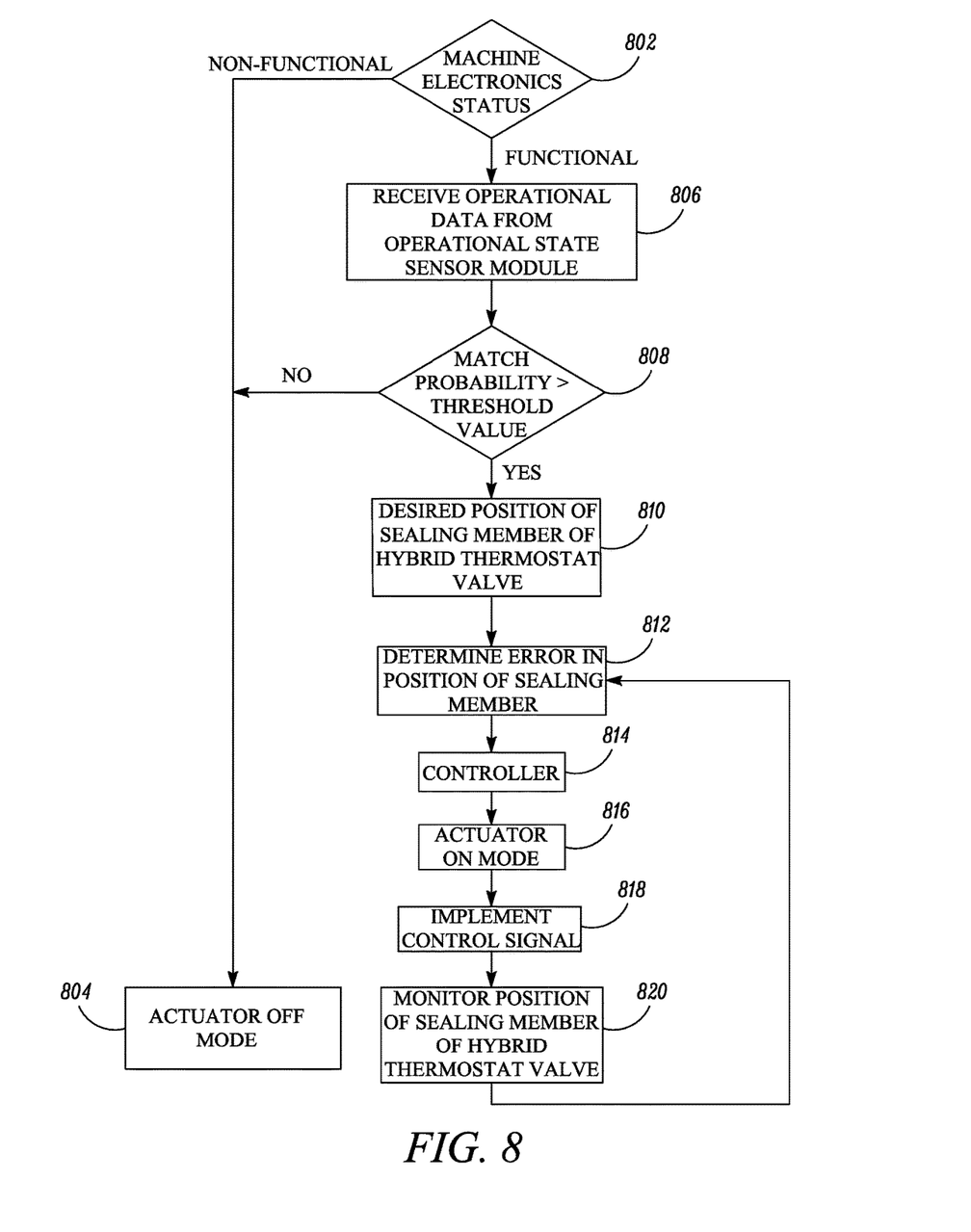
FIG. 8 is a flowchart of a method of controlling the hybrid thermostat valve, according to an embodiment of the present disclosure.

At 802, the status of the machine electronics is determined. If the status of the machine electronics is non-functional, the control of the hybrid thermostat valve 218 is passed to 804. The hybrid thermostat valve 218 is operated in the actuator OFF mode at 804. The information about the hybrid thermostat valve 218 operating in the actuator OFF may be provided to a control panel or a user interface which may display the status of the machine electronics being non-functional. The hybrid thermostat valve 218 in the actuator OFF mode is controlled like a mechanical thermostat valve based only on coolant temperature. However, if the status of the machine electronics is functional, the control passes to 806.

At 806, operational data is received from the operational state sensor module 222. The operational state sensor module 222 may include any one or a combination of the machine parameter sensor 224, the engine parameter sensor 226, the load sensor 228, and the grade sensor 230. The operational state sensor module 222 may include any other sensors as well as per application requirements. At 808, the operational data is compared with the pre-defined work cycle patterns and the probability of matching of the operational data with the pre-defined work cycle patterns is calculated. If the probability of matching is below the threshold value, the control of the hybrid thermostat valve 218 again passes to 804, and the hybrid thermostat valve 218 is controlled as a mechanical thermostat valve based on the coolant temperature only. In one embodiment, the threshold value is 50%. However, the threshold value may vary as per operational conditions and the application requirements.

If the probability of matching exceeds the threshold value, the control of the hybrid thermostat valve 218 passes to 810. At 810, the desired position 704 of the sealing member 312 of the hybrid thermostat valve 218 is determined as per the current work cycle segment being performed by the machine. At 812, the error 710 in the position of the sealing member 312 is determined. The position sensor 330 provides the actual position 708 of the sealing member 312. The error 710 is determined by comparing the desired position 704 with the actual position 708. The controller 232 receives the error at 814.

The controller 232 may check if the error 710 is in acceptable limits or whether the error 710 is representing any abnormalities in the hybrid thermostat valve 218. At 816, the controller 232 determines the hybrid thermostat valve 218 is operating in the actuator ON mode and implements the control signal to operate the hybrid thermostat valve 218 in the actuator ON mode at 818. Further, at 820, the position of the sealing member 312 of the hybrid thermostat valve may be monitored and communicated back to 812 to again calculate the error 710 and perform the closed loop feedback control for the position of the sealing member 312 of the hybrid thermostat valve 218 from 812 to 820.

The hybrid thermostat valve 218 and the method to control the hybrid thermostat valve 218 provide proactive means to cater to the cooling requirements of the engine cooling system 200 of the engine 202. The present disclosure may be applicable to any machine that may perform substantially repetitive work cycles. For example, the excavator 102 may perform the repetitive work cycle as illustrated with reference to FIG. 1 while attempting to dig a relatively dense material. At this time, for example, the temperature of the coolant may be about 80° C. Since the dig segment may consume a large amount of power, the engine 202 may operate at the high power condition and may generate significant amount of heat. Due to a time lag required for the temperature of the coolant to increase as a result of the dig segment, it may require a couple of minutes for the temperature of the coolant to increase and reach a differential set value, for example 90° C., that may trigger an opening of the hybrid thermostat valve 218 in the actuator OFF mode.

Further, by the time the temperature of the coolant may reach the differential set value, the excavator 102 may have already completed the dig segment and the lift segment, and may have begun the first swing segment. The engine power may decrease during the swing segment and less heat may be generated by the engine 202. During the dump segment, the heat generation by the engine 202 may be even lower than the swing segment. An ideal position of the sealing member 312 of the hybrid thermostat valve 218 may provide a higher flow of the coolant to the heat exchanger 206 during the dig and lift segments than during the swing and dump segments.

The present disclosure provides an efficient and cost effective method to actively control the cooling requirements of the coolant based on the current work cycle of the machine and/or the current engine power condition. Accordingly, the time lag in operation of the hybrid thermostat valve 218 is reduced as compared to the hybrid thermostat valve 218 operating based on the change of temperature of the coolant, such as during the actuator OFF mode. As a result, thermal fatigue of components of the engine 202 may be reduced. It should be noted that the hybrid thermostat valve 218 is adapted to operate in both of the actuator ON mode as well as the actuator OFF mode. More specifically, in a situation of failure of machine electronics, the hybrid thermostat valve 218 may continue to control the flow of the coolant between the cooling jacket 204 and the heat exchanger 206 based on the change of the temperature of the coolant, such as in a mechanical thermostat valve, thus, explaining hybrid nature of the hybrid thermostat valve 218.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A hybrid thermostat valve for a machine, the machine carrying out a repetitive work cycle having a plurality of work cycle segments, the hybrid thermostat valve comprising:
   an inlet port;
   a first outlet port;
   a second outlet port;
   a sealing member disposed between the inlet port and the first outlet port, the sealing member having at least one hole providing a first channel of fluid communication between the inlet port and the first outlet port;
   a valve element disposed between the inlet port and the first outlet port, wherein the valve element is adapted to selectively allow fluid communication between the inlet port and the first outlet port through the first channel;
   a bypass valve element disposed between the inlet port and the second outlet port, wherein the bypass valve element is adapted to selectively allow fluid communication between the inlet port and the second outlet port; and
   an actuator adapted to selectively control position of the sealing member to provide a second channel of fluid communication between the inlet port and the first outlet port based on a current work cycle segment being performed by the machine,
      wherein the actuator controls the position of the sealing member only when machine electronics are in a functional state.

2. The hybrid thermostat valve of claim 1, wherein the machine electronics include:
   electronic controls of the actuator, and
   an operational state sensor module.

3. The hybrid thermostat valve of claim 1, wherein the current work cycle segment is based on operational data of the machine and a pre-defined work cycle pattern.

4. The hybrid thermostat valve of claim 1,
wherein the current work cycle segment is based on operational data, and
wherein the operational data is collected through an operational state sensor module.

5. The hybrid thermostat valve of claim 4, wherein the operational state sensor module includes at least one of a machine parameter sensor, an engine parameter sensor, a load sensor, or a grade sensor.

6. The hybrid thermostat valve of claim 1, wherein the bypass valve element allows fluid communication between the inlet port and the second outlet port based on a coolant temperature.

7. The hybrid thermostat valve of claim 6, wherein the coolant temperature is determined through a temperature sensor.

8. The hybrid thermostat valve of claim 1,
wherein the first outlet port is fluidly coupled to a heat exchanger associated with an engine cooling system, and
wherein the second outlet port is fluidly coupled to a cooling jacket associated with an engine.

9. A machine comprising:
an engine having an engine cooling system;
a hybrid thermostat valve for controlling a flow of coolant in the engine cooling system,
the hybrid thermostat valve including:
an inlet port;
a first outlet port;
a second outlet port;
a sealing member disposed between the inlet port and the first outlet port, the sealing member having at least one hole providing a first channel of fluid communication between the inlet port and the first outlet port;
a valve element disposed between the inlet port and the first outlet port, wherein the valve element is adapted to selectively allow fluid communication between the inlet port and the first outlet port through the first channel;
a bypass valve element disposed between the inlet port and the second outlet port, wherein the bypass valve element is adapted to selectively allow fluid communication between the inlet port and the second outlet port; and
an actuator adapted to selectively control position of the sealing member to provide a second channel of fluid communication between the inlet port and the first outlet port based on a current work cycle segment being performed by the machine,
wherein the actuator controls the position of the sealing member only when machine electronics are in a functional state.

10. The machine of claim 9, wherein the machine electronics include electronic controls of the actuator.

11. The machine of claim 9, wherein the machine electronics include an operational state sensor module.

12. The machine of claim 11, wherein the operational state sensor module includes at least one of a machine parameter sensor, an engine parameter sensor, a load sensor, or a grade sensor.

13. The machine of claim 9, wherein the current work cycle segment is based on a work cycle pattern.

14. The machine of claim 9, wherein the current work cycle segment is based on operational data.

15. The machine of claim 14, wherein the operational data is collected through an operational state sensor module.

16. The machine of claim 15, wherein the operational state sensor module includes a load sensor or a grade sensor.

17. The machine of claim 9, wherein the bypass valve element allows fluid communication between the inlet port and the second outlet port based on a coolant temperature.

18. The machine of claim 17, wherein the coolant temperature is determined through a temperature sensor.

19. The machine of claim 9, wherein the first outlet port is fluidly coupled to a heat exchanger associated with the engine cooling system.

20. The machine of claim 9, wherein the second outlet port is fluidly coupled to a cooling jacket associated with the engine.

* * * * *